United States Patent [19]

Harris

[11] 4,149,973
[45] Apr. 17, 1979

[54] HORIZONTAL SEPARATOR

[76] Inventor: Frank N. Harris, 4761 SW. Martha St., Portland, Oreg. 97221

[21] Appl. No.: 758,017

[22] Filed: Jan. 10, 1977

[51] Int. Cl.² .............................................. B01D 17/02
[52] U.S. Cl. .................................... 210/305; 210/316; 210/521
[58] Field of Search ............... 210/296, 300, 305, 316, 210/320, 521, 522, 532 R, 533, 538, 540, DIG. 25, 299, 306, 310

[56] References Cited

U.S. PATENT DOCUMENTS

| | | | |
|---|---|---|---|
| 372,216 | 10/1887 | Gaillet | 210/305 X |
| 382,117 | 5/1888 | Smith | 210/305 |
| 691,835 | 1/1902 | Wyman | 210/296 |
| 2,002,253 | 5/1935 | Thompson | 210/300 X |
| 2,731,150 | 1/1956 | McCann | 210/300 |
| 2,751,998 | 6/1956 | Glasgow | 210/521 X |
| 3,227,649 | 1/1966 | Ghormley et al. | 40/310 X |
| 3,394,530 | 7/1968 | O'Neill et al. | 210/305 X |

Primary Examiner—William A. Cuchlinski, Jr.
Attorney, Agent, or Firm—Klarquist, Sparkman

[57] ABSTRACT

An oil-water mixture is introduced into a horizontal trough which is in a container and has baffles directing flow upwardly toward an opening in the container to a trap on the top of the container. Oil separates from the water as it flows along the baffles and moves by gravity separation up into the trap. An interface sensor in the trap opens an oil outlet from the trap whenever a sufficient quantity of oil accumulates. The water flows down from the upper part of the container through a coalescing filter to a water outlet located in the lower part of the container, being a three-stage separator.

7 Claims, 5 Drawing Figures

HORIZONTAL SEPARATOR

DESCRIPTION

This invention relates to improved oil-water separators and has for an object thereof the provision of improved oil-water separators.

Another object of the invention is to provide an oil-water separator having a baffled flow and an oil trap located at the top of the separator.

A further object of the invention is to provide an oil-water separator having upwardly sloping baffles in a horizontal inlet passage to separate oil and direct it up to a trap.

Another object of the invention is to provide an oil-water separator having a baffled first stage directing oil into a trap and followed by filter stages to remove any remnants of oil from the water.

Another object of the invention is to provide a horizontal separator having a trough inlet portion into a container with upwardly sloping baffles directing oil and water toward an upper trap for the oil and toward a coalescing filter for the oil which has previously been removed, after filtering, through an outlet in the lower part of the container.

Another object of the invention is to provide an oil-water separator having a container with a horizontal, generally tubular body and a removable end, an entrance trough having baffles sloping upwardly toward a trap opening in the top of the body comprising a first separation stage, a first upper coalescing filter extending from the inner end of the trough to the end of the container comprising a second separation stage, a second, lower coalescing filter extending the length of the body comprising a third separation stage and a water outlet positioned below the second filter.

Figure 1:
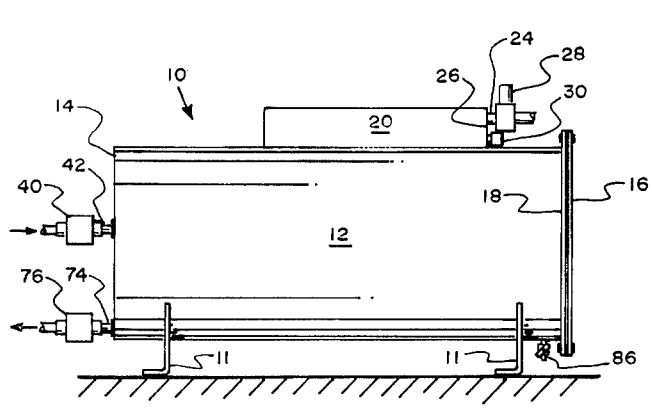
FIG. 1 is a side elevation view of an improved horizontal oil-water separator forming one embodiment of the invention.

Referring now in detail to the drawings, there is shown in FIGS. 1-4 a horizontal oil-water separator forming a specific embodiment of the invention including a container 10 supported by legs 11 and having a cylindrical body 12 having an integral end wall 14 and an access end wall or door 16 bolted and gasketed to a flange 18 of the body. The separator is a three-stage separator. A trap 20 is welded to the central, top portion of the body over a top outlet 22 in the body. The area of the outlet 22 is only a small fraction of the area covered by the trap. The trap has an oil outlet 24 at the upper portion of an end 26 leading to a solenoid valve 28 controlled by a known interface sensor 30 which actuates the valve to open when the oil has accumulated sufficiently to be down to the level of a probe 32 of the sensor. Then the oil is forced out of the outlet 24 by the internal pressure of the liquid which is kept above that of the atmosphere. When the oil is depleted to raise the oil-water interface level, the sensor actuates the valve 28 to close off the outlet.

Figure 3:
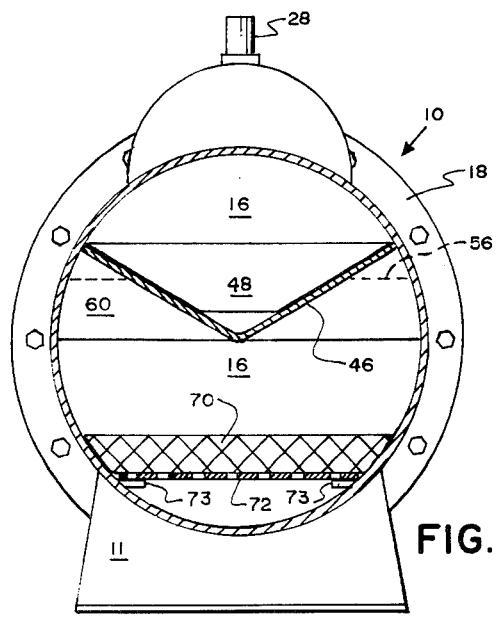
FIG. 3 is an enlarged vertical sectional view taken along line 3—3 of Fig. 2.
Figure 4:
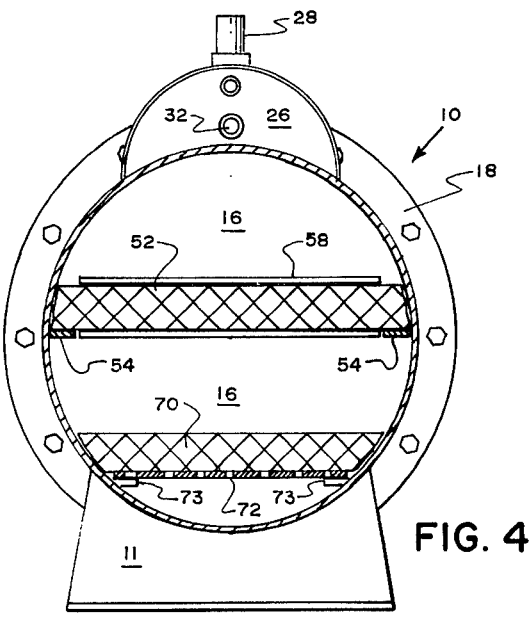
FIG. 4 is an enlarged vertical sectional view taken along line 4—4 of Fig. 2.

An oil-water mixture to be separated is introduced into the container under several pounds per square inch pressure by gravity or pump through a check valve 40 and a central inlet 42 in the end wall 14. The mixture enters a tubular or covered entrance portion 44 of a horizontal trough 46 welded to the interior of the body 12, and flows slowly along the trough and along upwardly sloping baffles 48 on the undersides of which the oil gathers. The oil flows on up along the baffles and on up to and through the opening 22 into the trap 20. The water, substantially completely free of oil, flows on into end portion 50 of the container and on down through an oil coalescing filter 52 of fiberglass or other suitable filter media. The baffle 52 is supported by side rails 54 and end sockets 56 and 58 mounted on end wall 60 of the trough and the door 16. The end wall 60 closes off all the area immediately below the trough, as best shown in FIG. 3 so that all the water must flow through the filter 52.

The water flows from the filter 52 through a second or lower coalescing filter 70 supported and covering a screen-like perforated plate 72 removably positioned on tabs 73 to the body 12 and end wall 14. The filter 70, while shown as horizontal, may be sloped upwardly and to the left, as viewed in FIG. 2. The filtered water flows under the filter 70 to and through an outlet 74 in the end wall 14 and a pressure relief valve 76 to a disposal area.

An oil drain outlet 80 is under the control of a manual shutoff valve 82, which in normal operation is kept closed. Similarly, a water drain outlet 84 is under the control of a manual shutoff valve 86.

Figure 5:
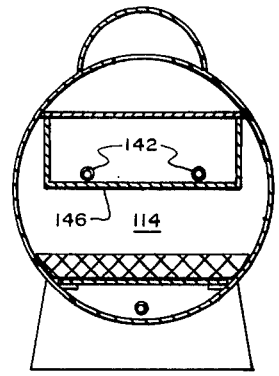
FIG. 5 is a vertical sectional view of an improved horizontal sectional oil-water separator forming an alternate embodiment of the invention.
Figure 2:
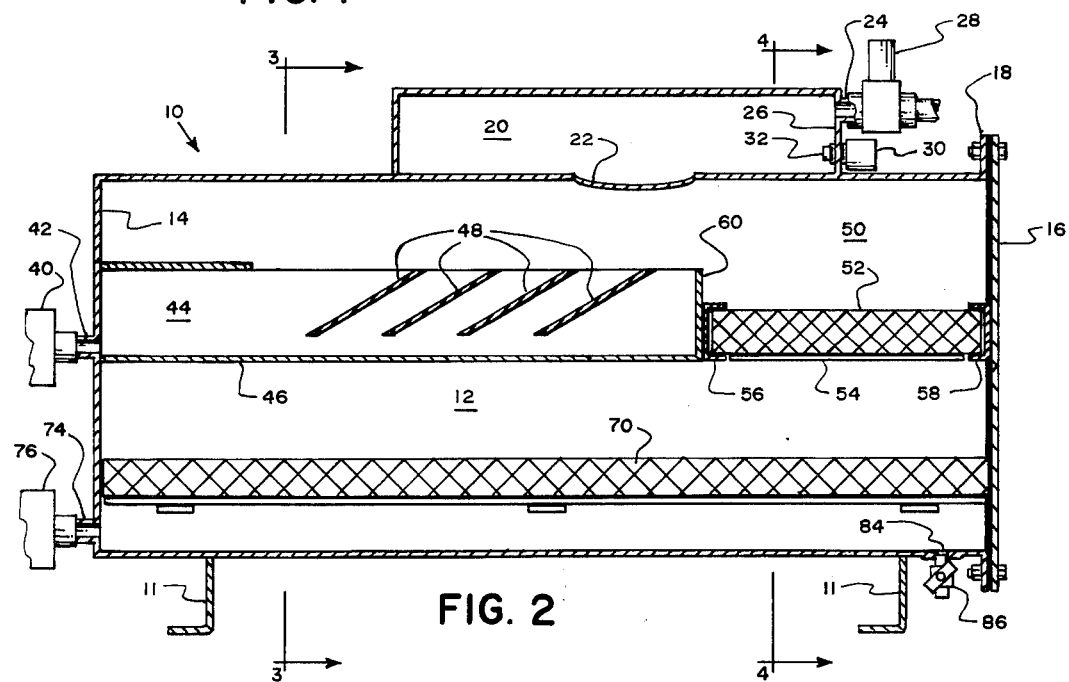
FIG. 2 is an enlarged, vertical sectional view of the separator of Fig. 1.

Embodiment of FIG. 5

A separator forming an alternate embodiment of the invention includes a container 110 like the container 10, and is like the separator of FIGS. 1-4 except that the separator of FIG. 5 is of higher capacity and has two inlets 142 in end wall 114 and has a generally U-shaped trough 146 rather than the V-shaped trough 46. Otherwise, the construction and operation of the separator of FIG. 5 are the same as those of the separator of FIGS. 1-4. It will be understood that, while the containers 10 and 110 are cylindrical, they could be square or otherwise rectangular in transverse cross-section.

The separator of FIGS. 1-4 has been operated to separate oil and kerosene from water in a mixture of about four-fifths water to produce water having less than two parts per million oil and/or kerosene.

What is claimed is:

1. In an oil-water separator:
   an elongated, horizontal container having an inlet end with a centrally located inlet therethrough and a second end,
   horizontal partition means positioned below the inlet and dividing the container into an upper portion and a lower portion,
   the partition means including a trough extending from the inlet end to a point short of the second end of the container and having a closed end at said point,
   the partition means also including a filter panel extending from the trough to the second end of the container,
   a plurality of baffles in the trough and sloping upwardly and toward the second end of the container, the container having in the top portion thereof an oil outlet near the closed end of the trough, and an oil trap positioned on the container above the oil outlet, the container also having a water outlet from the lower portion of the container, the partition means completely closing off the upper portion of the container from the lower position thereof to prevent flow to the lower, water outlet except through the filter panel.

2. The separator of claim 1 wherein the trough is V-shaped.

3. In an oil-water separator:

a container having an upper, oil outlet and a lower, water outlet, horizontal inlet passage means open at its top and positioned at a central level between the oil and water outlets and directed toward the upper oil outlet, baffles in the inlet passage means for gathering oil thereon and sloping upwardly toward the upper, oil outlet, and filter panel means extending generally horizontally from the inlet passage means, the filter panel means and the passage means extending the whole length of the container completely closing off the container between the outlets to prevent flow to the lower, water outlet except through the filter panel means.

4. The separator of claim 3 including a trap positioned on the top of the container for receiving oil from the upper, oil outlet.

5. The separator of claim 4 wherein the trap has a predetermined bottom area and the area of the upper, oil outlet is substantially smaller than said predetermined area.

6. The separator of claim 5 wherein the area of the upper oil outlet is a small fraction of said predetermined area.

7. In an oil-water separator:

a container having an upper, oil outlet and a lower, water outlet, horizontal inlet passage means open at its top and positioned at a central level between the oil and water outlets, filter panel means extending generally horizontally from the inlet passage means, the filter panel means and the passage means extending the whole length and width of the container to completely close off the container between the outlets to prevent flow to the lower, water outlet except through the filter panel means, the container being a horizontal cylinder having a closed end and a door at the other end, an oil-water inlet in the closed end, the inlet passage means being a trough extending only part way to the door, the filter panel means extending from the trough to the door, the inner end of the trough being closed and the portion of the trough adjacent the closed end of the container being covered, and a plurality of baffles in the trough sloping upwardly toward the upper, oil outlet.

* * * * *